United States Patent Office 3,501,466
Patented Mar. 17, 1970

3,501,466
3-CARBAMOYL AND 3-ALKOXYCARBONYL
BENZOTHIAZINE-1,1-DIOXIDES
Chris Royce Rasmussen, Ambler, Pa., assignor to McNeil Laboratories, Inc., a corporation of Pennsylvania
No Drawing. Filed Nov. 30, 1967, Ser. No. 688,298
Int. Cl. C07d 93/02; A61k 27/00; C08k 1/56
U.S. Cl. 260—243
17 Claims

ABSTRACT OF THE DISCLOSURE

The compounds herein are:
(I) 3 - carbamoyl-4-hydroxy-2H-1,2-benzothiazine-1,1-dioxide;
(II) 2-(lower alkoxycarbonyl-lower alkyl) and 2-(carbamoyl-lower alkyl) derivatives of (I);
(III) 4-hydroxy and 4-(lower alkoxy) derivatives of 3-carbamoyl - 2-(lower alkyl)-2H-1,2-benzothiazine-1,1-dioxide;
(IV) 4-hydroxy-3-(lower alkoxycarbonyl)carbamoyl-2H-1,2-benzothiazine-1,1-dioxides which may be substituted in the 2-position with lower alkyl or lower alkoxycarbonyl; and
(V) 3-ethoxycarbonyl-4-hydroxy-2H-1,2-benzothiazine-1,1-dioxide which may be substituted in the 2-position with lower alkyl or lower alkoxycarbonyl-lower alkyl.

All the compounds (I) through (V) are useful for their ultraviolet absorbing properties. Compounds (V) are useful in the syntheses of compounds (I) through (IV). Compound (I) is useful in the syntheses of compounds (II) through (IV). Pharmacological properties are also observed with certain of the foregoing compounds.

This invention relates to novel 3-carbamoyl-benzothiazine-1,1-dioxides and, more particularly, to such compounds having the following formulas:

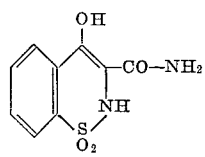

(I)

which compound (I) is known as 3-carbamoyl-4-hydroxy-2H-1,2-benzothiazine-1,1-dioxide;

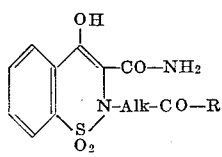

(II)

wherein Alk is an alkylene chain of from 1 to 5 carbon atoms and R is a member selected from the group consisting of lower alkoxy and —NH$_2$, which compounds (II) may be denoted as 2-(lower alkoxycarbonyl-lower alkyl) and 2-(carbamoyl-lower alkyl) derivatives of 3-carbamoyl-4-hydroxy-2H-1,2-benzothiazine-1,1-dioxide;

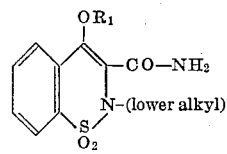

(III)

wherein R$_1$ is a member selected from the group consisting of hydrogen and lower alkyl, which compounds (III) may be denoted as 4-hydroxy and 4-(lower alkoxy) derivatives of 3-carbamoyl-2-(lower alkyl)-2H-1,2-benzothiazine-1,1-dioxide; and

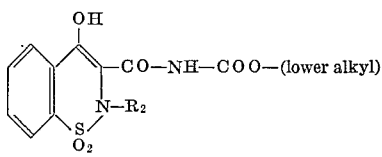

(IV)

wherein R$_2$ is a member selected from the group consisting of hydrogen, lower alkyl and lower alkoxycarbonyl, which compounds (IV), may be denoted as 4-hydroxy-3-(lower alkoxycarbonyl)-carbamoyl-2-R$_2$-2H-1,2-benzothiazine-1,1-dioxides.

This invention also relates to novel 3-ethoxycarbonyl-4-hydroxy-2-R'-2H-1,2-benzothiazine-1,1-dioxides having the formula;

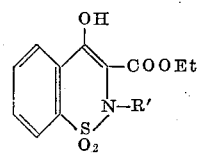

(V)

wherein R' is a member selected from the group consisting of hydrogen, lower alkyl and lower alkoxycarbonyl-lower alkyl. These novel esters are useful starting materials for preparing the 3-carbamoyl type of compounds (I)–(IV) as will be evident hereinafter.

As used herein, "lower alkyl" and "lower alkoxy" may be straight or branch chained saturated aliphatic hydrocarbons of from 1 to 5 carbon atoms other than tertiary, for example, primary and secondary alkyls such as methyl, ethyl, n-propyl, isopropyl and the like, and the corresponding alkoxys such as methoxy, ethoxy, n-propoxy, isopropoxy and the like.

The N-unsubstituted compounds of Formula V may be prepared from the N-(ethoxycarbonyl)methyl derivative of saccharin (VI), also known as ethyl 3-oxo-1,2-benzisothiazolin-2-acetate-1,1-dioxide, by heating at about 70° C. in absolute ethanol for about 2 hours in the presence of ethoxide ion. Conventional alkylation of the thus- obtained 3-ethoxycarbonyl-4-hydroxy-2H-1,2-benzothiazine-1,1-dioxide (V–a) with an appropriate alkylating agent such as a lower alkyl halide, e.g., methyl iodide, ethyl bromide and the like, or a lower alkyl ω-halo-alkanoic acid ester, e.g., ethyl chloroacetate, methyl 2-chloropropionate and the like, affords the corresponding compounds of Formula (V) wherein R' is other than hydrogen, i.e., 3-ethoxycarbonyl-2-(lower alkyl)-4-hydroxy-2H-1,2-benzothiazine-1,1-dioxide (V–b) and 3-ethoxycarbonyl-2-(lower alkoxycarbonyl - lower alkyl)-4-hydroxy-2H-1,2-benzothiazine-1,1-dioxide (V–c). The alkylation may be carried out in a variety of polar or nonpolar solvents such as the lower alkanols, e.g., methanol, ethanol, isopropanol and the like; ethers such as diethyl ether, dioxane and the like; dimethylformamide; or aromatic hydrocarbons such as benzene, toluene, xylene and the like. The alkylation may also be carried out in the presence of an alkali or alkaline earth metal hydroxide or alkoxide. The foregoing reaction schemes may be illustrated as follows:

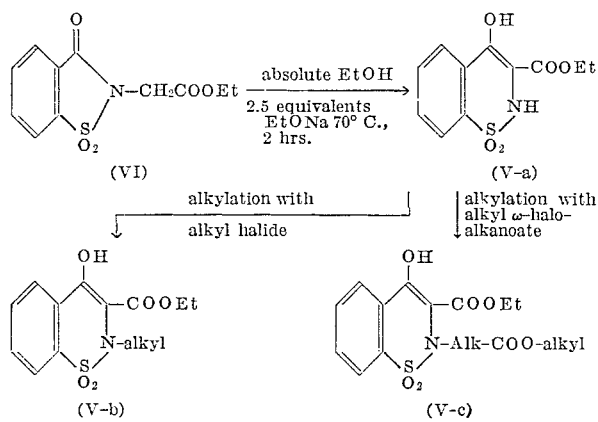

Conventional ammonolysis of the ester (V–a) affords a method of obtaining the novel amide (I), namely, 3-carbamoyl-4-hydroxy-2H-1,2-benzothiazine-1,1 - dioxide. Alkylation of the latter, using an equivalent amount of appropriate lower alkyl ω-halo-alkanoate as described previously, yields the 3-carbamoyl - 4-hydroxy-2-(lower alkoxycarbonyl-lower alkyl) - 2H - 1,2-benzothiazine-1,1-dioxides of Formula II which, upon ammonolysis, are converted into the corresponding 3-carbamoyl-4-hydroxy-2 - (carbamoyl - lower alkyl)-2H-1,2-benzothiazine-1,1-dioxides of Formula II.

These reaction schemes may be schematically illustrated as follows:

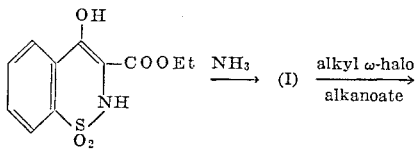

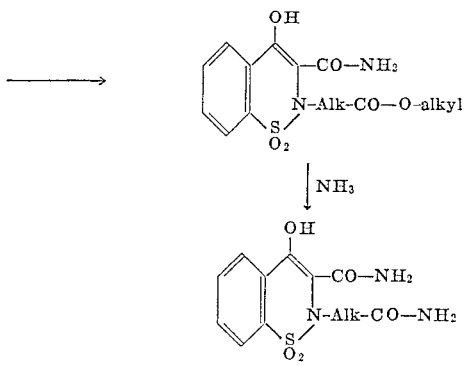

Alkylation of the amide (I) with an equivalent amount of an appropriate lower alkyl halide yields the compounds of Formula III wherein $R_1$ is hydrogen. Alternatively, such 3 - carbamoyl-4-hydroxy-2-(lower alkyl)-2H-1,2-benzothiazine-1,1-dioxides may be obtained by ammonolysis of the ester (V–b). Alkylation of (I) with a large excess of an alkyl iodide, or alkylation of the 4-hydroxy derivative of (III) with the same or another alkyl iodide, results in the compounds of (III) wherein $R_1$ is lower alkyl.

These reaction schemes may be schematically illustrated as follows:

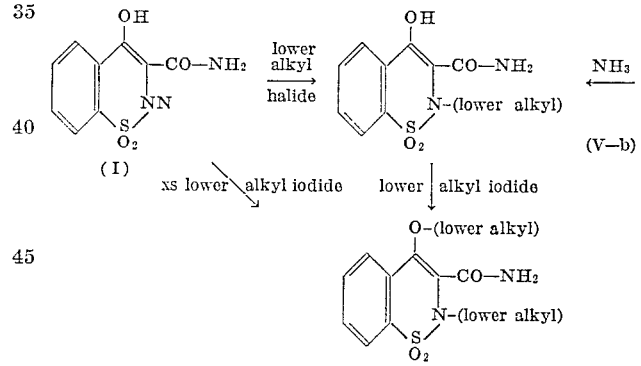

The compounds of Formula IV wherein $R_2$ is hydrogen (IV–a) are readily obtained by acylation of the amide (I) with slightly more than one equivalent of an appropriate lower alkyl chloroformate in dimethylformamide (DMF) in the presence of alkoxide ion. The alkoxide ion is preferably the same as the alkyl moiety of the chloroformate acylating agent. Acylation of (I) with a large excess of a lower alkyl chloroformate in aqueous alkali metal hydroxide or carbonate, for example, sodium or potassium hydroxide, sodium or potassium carbonate, and the like, yields the corresponding compounds of Formula IV wherein $R_2$ is lower alkoxycarbonyl (IV–b). To prepare the compounds of Formula IV wherein $R_2$ is lower alkyl (IV–c), acylation is carried out on the compounds of Formula III wherein $R_1$ is hydrogen, with a large excess of an appropriate lower alkyl chloroformate in aqueous alkali metal hydroxide or carbonate as previously described. Alternatively, the N-unsubstituted 4-hydroxy-3-(lower alkoxycarbonyl) carbamoyl - 2H-1,2-benzothiazine-1,1-dioxides of Formula IV–a may be alkylated with an appropriate lower alkyl halide to yield the corresponding compounds of Formula IV–c wherein $R_2$ is lower alkyl.

The following diagramatic scheme illustrates the preparation of the Formula IV compounds:

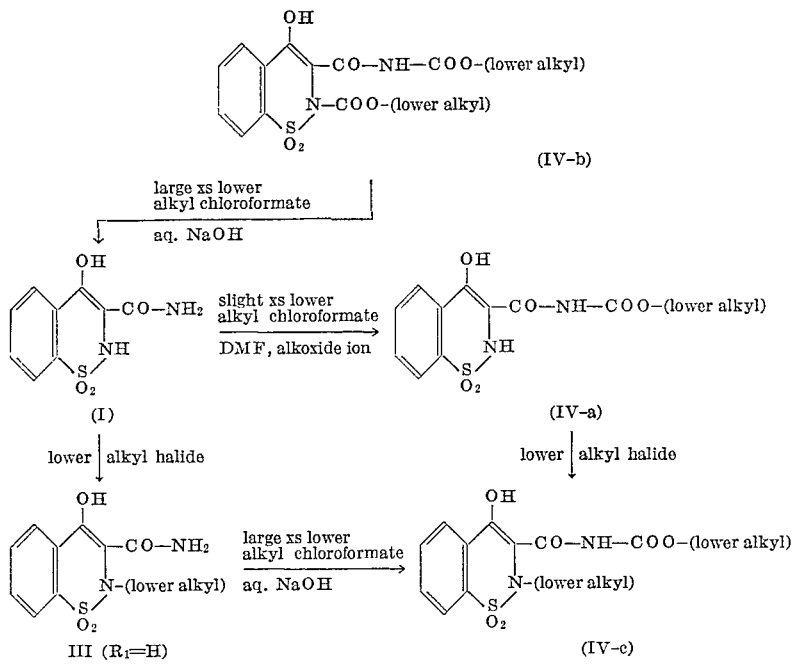

All the compounds of this invention, represented by Formulas I through V, absorb ultraviolet (U.V.) light in the range of 300–340 m$\mu$ making them useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g. nylon) fibers and polyester fibers. The inclusion of about 0.01–5.0 percent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

In addition to their ultra-violet absorbing utility, several of the novel compounds herein possess valuable pharmacological properties which make them suitable for incorporation into conventional oral and parenteral pharmaceutical forms such as tablets, capsules, suspensions, injectables and the like. For example, the compound of Formula I has been found to possess anti-inflammatory activity as demonstrated in rats by the kaolin-induced paw edema (8 percent inhibition observed) and cotton pellet granuloma assays at an oral dose of about 100 mg./kg. body weight. Furthermore, ataxia is observed in mice at an intraperitoneal dose of about 100 mg./kg. body weight, ataxia indicating central nervous system depressant activity.

Anti-inflammatory activity has also been observed with those compounds of Formula II wherein R is lower alkoxy. For example, a 20 percent inhibition is observed in the kaolin-induced rat paw edema assay with ethyl 3-carbamoyl - 4 - hydroxy - 2H - 1,2 - benzothiazine - 2 - acetate 1,1 - dioxide at an oral dose of about 100 mg./kg. body weight. Furthermore, the corresponding R=methoxy derivative exhibits antiviral activity against asian influenza virus at levels of about 100 micrograms in vitro. When R in the compounds of Formula II is —NH$_2$, ataxia is observed in mice at an intraperitoneal dose of about 100 mg./kg. body weight which indicates CNS depressant activity.

The compounds of Formula III also demonstrate anti-inflammatory activity. For example, when R$_1$ is either hydrogen or methyl and the lower alkyl function in the 2-position is methyl, a 4–39 percent inhibition is observed in the kaolin-induced rat paw edema assay at an oral dose level of about 100 mg./kg. body weight.

One of the compounds of Formula V, namely, ethyl 3 - ethoxycarbonyl - 4 - hydroxy-2H-1,2-benzothiazine-2-acetate-1,1-dioxide, has been found to possess an interesting and unusual pharmacological property. When administered to dogs (anesthetized with thiopental sodium and maintained with $\alpha$-chloralose) at a dose of 5 mg./kg. body weight intravenously, irreversible ventricular fibrillation sets in within one minute in more than 90% of the dogs tested (observed: 12 deaths out of 13 dogs). If quinidine is preadministered to the anesthetized dogs at a dose of 10 mg./kg. body weight i.v. followed by 5 mg./kg. i.v. of ethyl 3 - ethoxycarbonyl-4-hydroxy-2H-1,2-benzothiazine-2-acetate-1,1-dioxide after 15 minutes, 100% of the dogs so tested survived and did not develop ventricular fibrillation. In this manner, this compound can be used to pharmacologically screen compounds for ventricular fibrillation preventive activity.

The following examples are intended to illustrate, but not to limit, the scope of the present invention.

EXAMPLE I

Ethyl 4-hydroxy-2H-1,2-benzothiazine-3-carboxylate-1,1-dioxide

To a solution of 42.6 g. (1.85 g. atoms) of sodium dissolved in 800 ml. of absolute ethanol at 40° C. is added 249.5 g. (0.926 mole) of ethyl 3-oxo-1,2-benzisothiazoline - 2 - acetate-1,1-dioxide. The yellow mixture is warmed to 58–70° C. for 2 hrs. During the course of the reaction a yellow sodium salt separates. The reaction mixture is then poured into an ice-concentrated aqueous hydrochloric acid (150 ml.) mixture. The resulting viscous light yellow liquid is extracted into ether (1×2 liters; 1×1 liter). The combined ether extracts are dried over sodium sulfate-Norite A and the solvent is removed in vacuo to leave a viscous residue containing some suspended crystals. Ether trituration affords a first crop of ethyl 4 - hydroxy - 2H - 1,2 - benzothiazine - 3 - carboxylate-1,1-dioxide, M.P. 139–141° C., which is filtered off. To the ether filtrate is added benzene (200 ml.) and a few milliliters of cyclohexane. Overnight standing at 10–15° C. affords a second crop of the product. Recrystallization of the combined crops from acetone-benzene yields pure ethyl 4 - hydroxy-2H-1,2-benzothiazine-3-carboxylate-1,1-dioxide as large irregular almost colorless crystals, M.P. 139.5–141.5° C.

*Analysis.*—Calcd. for $C_{11}H_{11}NO_5S$ (269.28) (percent): C, 49.06; H, 4.12; N, 5.20; S, 11.91. Found: C, 49.12; H, 4.18; N, 4.88; S, 11.89.

EXAMPLE II

Ethyl 3-ethoxycarbonyl-4-hydroxy-2H-1,2-benzothiazine-2-acetate-1,1-dioxide

In a three-neck round-bottom flask, equipped with condenser, dropping funnel, and magnetic stirrer, 2.7 g. (0.12 mole) of sodium is dissolved in 200 ml. of ethanol and then 26.9 g. (0.10 mole) of ethyl 4-hydroxy-2H-1,2-benzothiazine-3-carboxylate-1,1-dioxide is added. To the stirred suspension, heating on a steam bath, 20 g. (0.12 mole) of ethyl bromoacetate is added dropwise. The reaction mixture is poured into water and the precipitate filtered off, giving about 83.5% of crude ethyl 3-ethoxycarbonyl - 4 - hydroxy - 2H - 1,2 - benzothiazine - 2 - acetate-1,1-dioxide; M.P. 87–89° C. The pure sample is prepared by recrystallization from ethanol, M.P. 97–98° C.

EXAMPLE III

Ethyl 4-hydroxy-2-methyl-2H-1,2-benzothiazine-3-carboxylate-1,1-dioxide

A solution of 2.53 g. (0.11 g. atom) of sodium in 250 ml. of methanol is evaporated to near dryness in vacuo and 50 ml. of DMF is added. Further concentration in vacuo removes most of the methanol. To the warm suspension is added 26.93 g. (0.1 mole) of ethyl 4-hydroxy-2H-1,2-benzothiazine-3-carboxylate-1,1-dioxide. After solution is complete, the mixture is cooled to 25° C. and 17.0 g. (0.12 mole) of methyliodide is added in one portion with stirring. After standing at room temperature for 30 min., an additional 8.5 g. (0.06 mole) of methyliodide is added. After warming on the steam bath about 15 min., water is added and the resulting crystals are collected. Recrystallization from acetone-ethanol (95%) affords the pure product, ethyl 4-hydroxy-2-methyl-2H-1,2-benzothiazine-3-carboxylate-1,1-dioxide; M.P. 136–138° C.

EXAMPLE IV 3-carbamoyl-4-hydroxy-2H-1,2-benzothiazine-1,1-dioxide

A solution of 13.45 g. (0.05 mole) of ethyl 4-hydroxy-2H - 1,2 - benzothiazine - 3 - carboxylate - 1,1 - dioxide in 300 ml. of aqueous ammonia (28%) is allowed to stand at room temperature for two days. Removal of most of the excess ammonia and water in vacuo gives a yellow suspension of solid. Neutralization of residual ammonia with 10% hydrochloric acid affords a crude precipitate of the product. Recrystallization of the precipitate from acetone-ethanol-water gives the pure product, 3-carbamoyl-4-hydroxy-2H-1,2-benzothiazine-1,1-dioxide, as fine colorless needles (about 76% yield); M.P. 239–242° C.

*Analysis.*—Calcd. for $C_9H_8N_2O_4S$ (240.25) (percent): C, 45.00; H, 3.36; N, 11.66; S, 13.35. Found: C, 45.10; H, 3.32; N, 11.64; S, 13.35.

EXAMPLE V

Methyl 3-carbamoyl-4-hydroxy-2H-1,2-benzothiazine-2-acetate-1,1-dioxide

Sodium (1.55 g.; 0.067 g. atom) is dissolved in 100 ml. of absolute methanol. Most of the methanol is then removed in vacuo. Sixty milliliters of DMF is added and the mixture is taken almost to dryness. DMF (60 ml.) is then added followed by 16.05 g. (0.067 mole) of 3-carbamoyl - 4 - hydroxy - 2H - 1,2 - benzothiazine - 1,1 - dioxide. The homogeneous solution is stirred while 10.4 g. (0.068 mole) of methyl bromoacetate is added over a period of 5 min. The mixture darkens somewhat and is stirred overnight at ambient temperature. Most of the DMF is removed in vacuo. Dilution with water affords 19.09 g. (91%) of light brown crystals; M.P. 216–218° C. Recrystallization from acetone gives pure material, methyl 3 - carbamoyl - 4 - hydroxy - 2H - 1,2 - benzothiazine - 2 - acetate-1,1-dioxide, as colorless crystals, M.P. 223–225° C. (dec.).

*Analysis.*—Calcd. for $C_{12}H_{12}N_2O_6S$ (312.31) (percent): C, 46.15; H, 3.87; N, 8.97; S, 10.27. Found: C, 46.30; H, 4.00; N, 8.88; S, 10.23.

EXAMPLE VI

Ethyl 3-carbamoyl-4-hydroxy-2H-1,2-benzothiazine-2-acetate-1,1-dioxide

A dimethylformamide and sodium ethoxide solution is prepared by dissolving 2.7 g. (0.12 mole) of sodium in ethanol. The ethanol is removed in vacuo and 200 ml. of dimethylformamide is added. To the stirred solution at room temperature is added 24.0 g. (0.10 mole) of 3-carbamoyl - 4 - hydroxy-2H-1,2-benzothiazine-1,1-dioxide and 20.0 g. (0.12 mole) of ethyl bromoacetate. Solvent is removed in vacuo and water is added to the residue yielding about 73% of crude product, M.P. 161–163° C. upon filtration. The pure material, ethyl 3-carbamoyl-4-hydroxy-2H-1,2-benzothiazine-2-acetate-1,1-dioxide, is obtained by recrystallization from acetone-ethanol water, M.P. 165–166° C.

*Analysis.*—Calc'd for $C_{13}H_{14}N_2O_6S$ (326.33) (percent): C, 47.85; H, 4.32;; N, 8.58. Found (percent). C, 47.95; H, 4.26; N, 8.53.

EXAMPLE VII 3-carbamoyl-4-hydroxy-2H-1,2-benzothiazine-2-acetamide-1,1-dioxide In 450 ml. of ammonia water, 10.8 g. (0.033 mole) of ethyl 3 - carbamoyl - 4-hydroxy-2H-1,2-benzothiazine-2-acetate-1,1-dioxide is dissolved and allowed to stand for 6 days. The solvent is then concentrated in vacuo and the residual solution poured into ice-conc. hydrochloric acid. The resultant solid is collected, giving about 82% yield of product, 3-carbamoyl-4-hydroxy-2H1,2-benzothiazine-2-acetamide-1,1-dioxide. The pure material is prepared by recrystallization from acetone-water, M.P. 244–245° C.

*Analysis.*—Calc'd for $C_{11}H_{11}N_3O_5S$ (279.30) (percent): C, 44.44; H, 3.73; N, 14.14. Found (percent): C, 44.47; H, 3.81; N, 14.05.

EXAMPLE VIII 3-carbamoyl-4-hydroxy-2-methyl-2H-1,2-benzothiazine-1,1-dioxide

A solution of 1.265 g. (0.055 g. atom) of dissolved sodium in methanol is taken to near dryness in vacuo. To the residue is added 50 ml. of DMF followed by 12.0 g. (0.05 mole) of 3-carbamoyl-4-hydroxy-2H-1,2-benzothiazine-1,1-dioxide. When solution of the latter is complete, 7.81 g. (0.055 mole) of methyl iodide is added in one portion with stirring. The color of the solution quickly fades to light yellow. The mixture is heated on a steam bath for 1 hr., the DMF is removed in vacuo, and the residue is treated with excess water. The resulting crystals are collected and recrystallized twice from acetone-methanol to give the product, 3-carbamoyl-4-hydroxy-2-methyl-2H-1,2-benzothiazine-1,1 - dioxide, M.P. 240–245° C. (dec.).

*Analysis.*—Calc'd for $C_{10}H_{10}N_2O_4S$ (254.27) (percent): C, 47.24; H, 3.96. Found (percent): C, 47.22; H, 4.08.

EXAMPLE IX 3-carbamoyl-4-hydroxy-2-methyl-2H-1,2-benzothiazine-1,1-dioxide

A solution of 2.82 g. (0.01 mole) of ethyl 4-hydroxy-2-methyl-2H-1,2-benzothiazine-3-carboxylate-1,1-dioxide in 100 ml. of concentrated aqueous ammonia solution (28%) is allowed to stand at room temperature in a tightly stoppered flask for 4 months. Solvent and excess ammonia are removed in vacuo giving a residue which is recrystallized from acetone to give the product, 3-carbamoyl - 4 - hydroxy-2-methyl-2H-1,2-benzothiazine-1,1-dioxide.

EXAMPLE X 3-carbamoyl-4-methoxy-2-methyl-2H-1,2-benzothiazine-1,1-dioxide

To 12.0 g. (0.05 mole) of 3-carbamoyl-4-hydroxy-2H-1,2-benzothiazine1,1-dioxide in 500 ml. of reagent acetone is added 85 g. of anhydrous potassium carbonate and 71 g. (0.5 mole) of methyl iodide. The mixture is heated under reflux for 6 hrs. and then allowed to stand at room temperature overnight. The mixture is filtered and the solvent is removed in vacuo to leave a semisolid gum. Water is added with stirring, yielding a gummy solid which is washed with methanol to remove most of the oily portion. Recrystallization from acetone gives the product, 3 - carbamoyl-4-methoxy-2-methyl-2H-1,2-benzothiazine-1,1-dioxide; M.P. 201–213° C.

*Analysis.*—Calc'd for $C_{11}H_{12}N_2O_4S$ (268.3) (percent): C, 49.24; H, 4.51; N, 10.44; S, 11.95. Found (percent): C, 49.31; H, 4.59; N, 10.20; S, 11.92.

EXAMPLE XI 3-(ethoxycarbonyl)carbamoyl-4-hydroxy-2H-1,2-benzothiazine-1,1-dioxide To 50 ml. of absolute ethanol is added 2.76 g. (0.12 g. atom) of sodium. After solution of the sodium is complete, the excess ethanol is removed in vacuo and 75 ml. of DMF is added to the residue. There is then added 24.0 g. (0.1 mole) of 3-carbamoyl-4-hydroxy-2H-1,2-benzothiazine-1,1-dioxide. After the latter has dissolved, 12.96 g. (0.12 mole) of ethyl chloroformate is added slowly with stirring. The mixture is stirred at room temperature for 1 hr. and then most of the DMF is removed in vacuo. The oily residue is treated with water and allowed to stand till it crystallizes. Filtration gives the crude product, M.P. 183–185° C. Two recrystallizations from acetone-water gives the pure material, 3-(ethoxycarbonyl) carbamoyl-4-hydroxy-2H-1,2-benzothiazine-1,1 - dioxide, M.P. 192–193° C.

*Analysis.*—Calc'd for $C_{12}H_{12}N_2O_6S$ (312.30) (percent): C, 46.15; H, 3.87; S, 10.27. Found (percent): C, 46.00; H, 3.88; S, 10.19.

EXAMPLE XII

Ethyl 3-(ethoxycarbonyl)carbamoyl-4-hydroxy-2H-1,2-benzothiazine-2-carboxylate-1,1-dioxide A solution of 4.8 g. (0.02 mole) of 3-carbamoyl-4-hydroxy-2H-1,2-benzothiazine-1,1-dioxide in 25 ml. of aqueous sodium carbonate (10%) is vigorously stirred (magnetically) while 2 ml. of ethyl chloroformate is added. Repeated addition of aqueous base (10% sodium carbonate or 10% sodium hydroxide) and ethyl chloroformate are carried out such that the pH remains alkaline. When no further visual evidence of product separation (as a sodium salt) is noticed, saturated sodium chloride solution is added and the product is collected and washed with saturated sodium chloride. Redissolution of the product in warm water followed by acidification with dilute hydrochloric acid gives the product, ethyl 3-(ethoxycarbonyl)carbamoyl-4-hydroxy - 2H - 1,2-benzothiazine-2-carboxylate-1,1-dioxide. Recrystallization from acetone-methanol gives the pure material, M.P. 159–160° C.

*Analysis.*—Calc'd for $C_{15}H_{16}N_2O_8S$ (384.38) (percent): C, 46.87; H, 4.20. Found (percent): C, 46.72; H, 4.27.

EXAMPLE XIII 3-(ethoxycarbonyl)carbamoyl-4-hydroxy-2-methyl-2H-1,2-benzothiazine-1,1-dioxide A solution of 7.62 g. (0.03 mole) of 3-carbamoyl-4-hydroxy-2-methyl-2H-1,2-benzothiazine-1,1-dioxide in 25 ml. of aqueous sodium hydroxide (10%) is vigorously stirred while 6 ml. of ethyl chloroformate is added. Repeated additions of base and ethyl chloroformate are carried out to maintain alkaline conditions (pH 8–9) and until no further precipitation of product (as sodium salt) is noticed. Solid sodium chloride to saturate the solution is added and the resulting product is collected and washed with saturated sodium chloride solution. Dissolving the salt in warm water and acidification with dilute hydrochloric acid yields 3 - (ethoxycarbonyl)carbamoyl - 4-hydroxy-2-methyl-2H-1,2-benzothiazine - 1,1 - dioxide. Recrystallization from dioxane gives the pure material, M.P. 196–202° C.

*Analysis.*—Calcd. for $C_{13}H_{14}N_2O_6S$ (326.34) (percent): C, 47.85; H, 4.32. Found: C, 47.87; H, 4.49.

EXAMPLE XIV 3-(ethoxycarbonyl)carbamoyl-4-hydroxy-2-methyl-2H-1,2-benzothiazine-1,1-dioxide To a solution of 0.34 g. (0.005 mole) of sodium ethoxide in 10 ml. of DMF is added 1.2 g. (0.004 mole) of 3-(ethoxycarbonyl)carbamoyl - 4 - hydroxy-2H-1,2-benzothiazine-1,1-dioxide. After solution is complete, 2 ml. of methyl iodide is added. After stirring at room temperature for 1 hr., water is added. The resulting crystals are filtered off and triturated with acetone to yield the product as an insoluble solid. Recrystallization from dioxane-1,2-dimethoxyethane-acetone affords 3-(ethoxycarbonyl) carbamoyl - 4 - hydroxy - 2-methyl-2H-1,2-benzothiazine-1,1-dioxide, M.P. 196–202° C. (dec.) The I.R. and U.V. spectra are identical in all aspects with that obtained from Example XIII.

EXAMPLE XV

Methyl 3-ethoxycarbonyl-4-hydroxy-2H-1,2-benzothiazine-2-acetate-1,1-dioxide

The procedure of Example VI is repeated except that equivalent quantities of methyl bromoacetate and ethyl 4 - hydroxy - 2H - 1,2-benzothiazine-3-carboxylate-1,1-dioxide are substituted for the ethyl bromoacetate and 3 - carbamoyl - 4 - hydroxy-2H-1,2-benzothiazine-1,1-dioxide, respectively, used therein to yield as the product, methyl 3 - ethoxycarbonyl - 4 - hydroxy - 2H - 1,2-benzothiazine-2-acetate-1,1-dioxide, M.P. 127–130° C.

What is claimed is:

1. 3 - carbamoyl - 4 - hydroxy - 2H - 1,2 - benzothiazine-1,1-dioxide.

2. A 3 - carbamoyl - 4 - hydroxy - 2H - 1,2 - benzothiazine-1,1-dioxide having the formula:

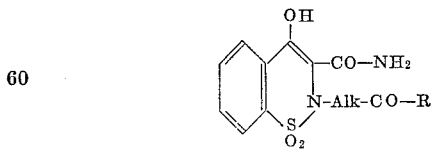

wherein Alk is an alkylene chain of from 1 to 5 carbon atoms and R is a member selected from the group consisting of lower alkoxy and —$NH_2$.

3. The compound of claim 2 which is methyl 3 - carbamoyl - 4 - hydroxy - 2H - 1,2 - benzothiazine - 2 - acetate-1,1-dioxide.

4. The compound of claim 2 which is ethyl 3 - carbamoyl-4-hydroxy-2H-1,2-benzothiazine - 2 - acetate-1,1-dioxide.

5. The compound of claim 2 which is 3-carbamoyl-4-hydroxy-2H-1,2-benzothiazine-2-acetamide - 1,1 - dioxide.

6. A 3-carbamoyl-2-(lower alkyl)-2H-1,2-benzothiazine-1,1-dioxide having the formula:

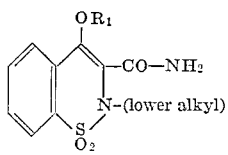

wherein $R_1$ is a member selected from the group consisting of hydrogen and lower alkyl.

7. The compound of claim 6 which is 3-carbamoyl-4-hydroxy-2-methyl-2H-1,2-benzothiazine-1,1-dioxide.

8. The compound of claim 6 which is 3-carbamoyl-4-methoxy-2-methyl-2H-1,2-benzothiazine-1,1-dioxide.

9. A 4-hydroxy-3-(lower alkoxycarbonyl)carbamoyl-2H-1,2-benzothiazine-1,1-dioxide having the formula:

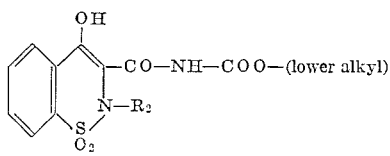

wherein $R_2$ is a member selected from the group consisting of hydrogen, lower alkyl and lower alkoxycarbonyl.

10. The compound of claim 9 which is 3-(ethoxycarbonyl)carbamoyl-4-hydroxy-2H-1,2-benzothiazine-1,1-dioxide.

11. The compound of claim 9 which is ethyl 3-(ethoxycarbonyl)carbamoyl-4-hydroxy-2H-1,2-benzothiazine-2-carboxylate-1,1-dioxide.

12. The compound of claim 9 which is 3-(ethoxycarbonyl)carbamoyl-4-hydroxy-2-methyl-2H-1,2-benzothiazine-1,1-dioxide.

13. A 3-ethoxycarbonyl-4-hydroxy-2H-1,2-benzothiazine-1,1-dioxide having the formula:

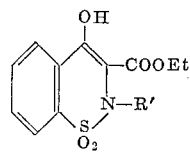

wherein R' is a member selected from the group consisting of hydrogen, lower alkyl and lower alkoxycarbonyl-lower alkyl.

14. The compound of claim 13 which is ethyl 4-hydroxy-2H-1,2-benzothiazine-3-carboxylate-1,1,-dioxide.

15. The compound of claim 13 which is ethyl 3-ethoxycarbonyl-4-hydroxy-2H-1,2-benzothiazine-2-acetate-1,1-dioxide.

16. The compound of claim 13 which is ethyl 4-hydroxy-2-methyl-2H-1,2-benzothiazine-3-carboxylate-1,1-dioxide.

17. The compound of claim 13 which is methyl 3-ethoxy-carbonyl-4-hydroxy-2H-1,2-benzothiazine-2-acetate-1,1-dioxide.

References Cited
UNITED STATES PATENTS 3,284,450  11/1966  Kraaijeveld et al. ____ 260—243
3,408,347  10/1968  Shavel et al. _____ 260—243

HENRY R. JILES, Primary Examiner

U.S. Cl. X.R.

252—300; 260—45.8, 999